United States Patent Office 3,393,404
Patented July 16, 1968

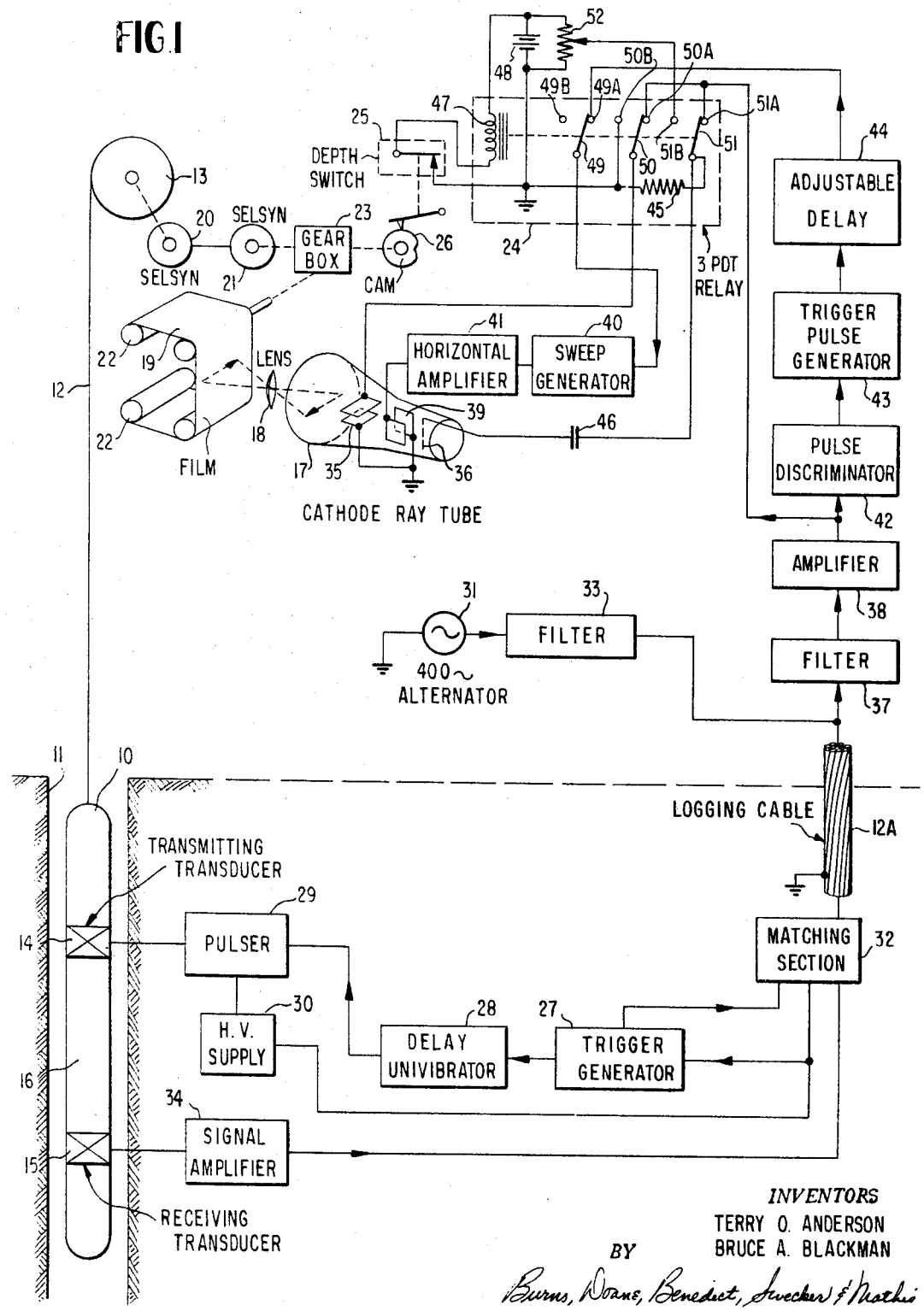

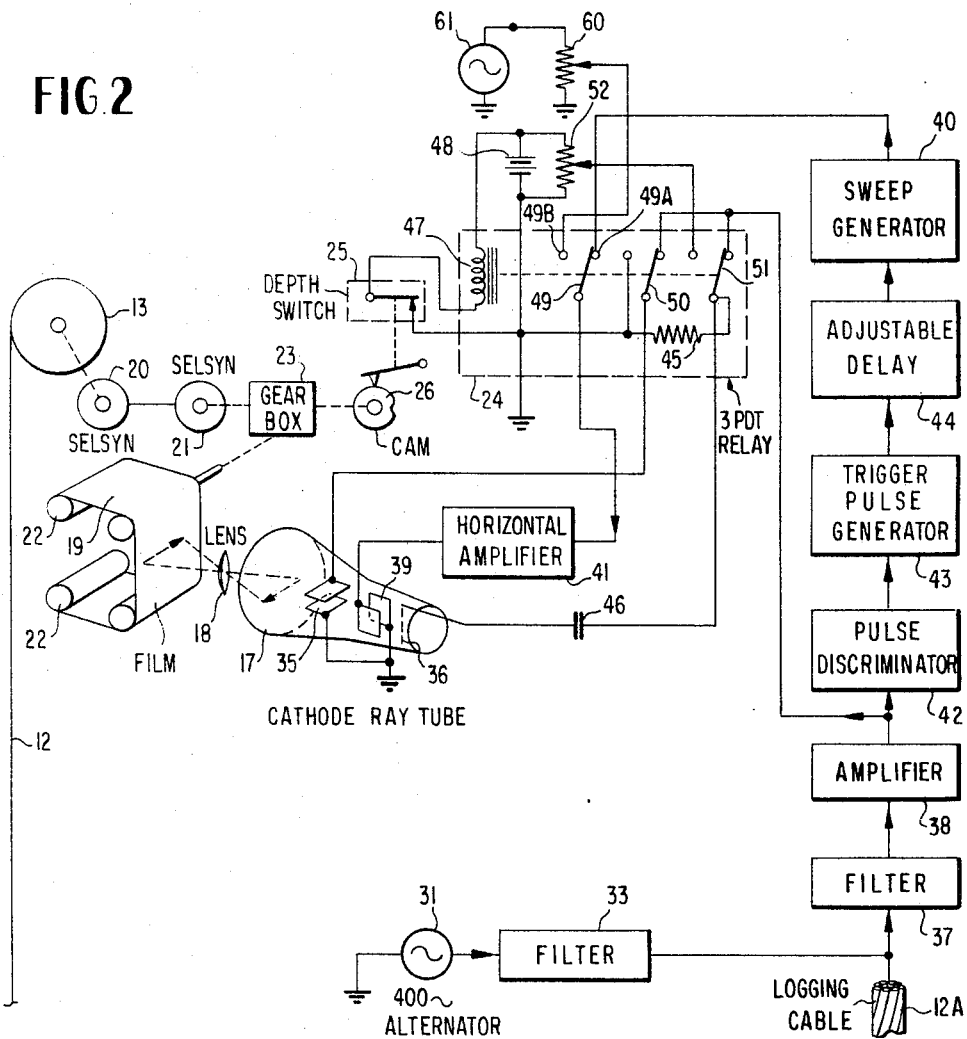

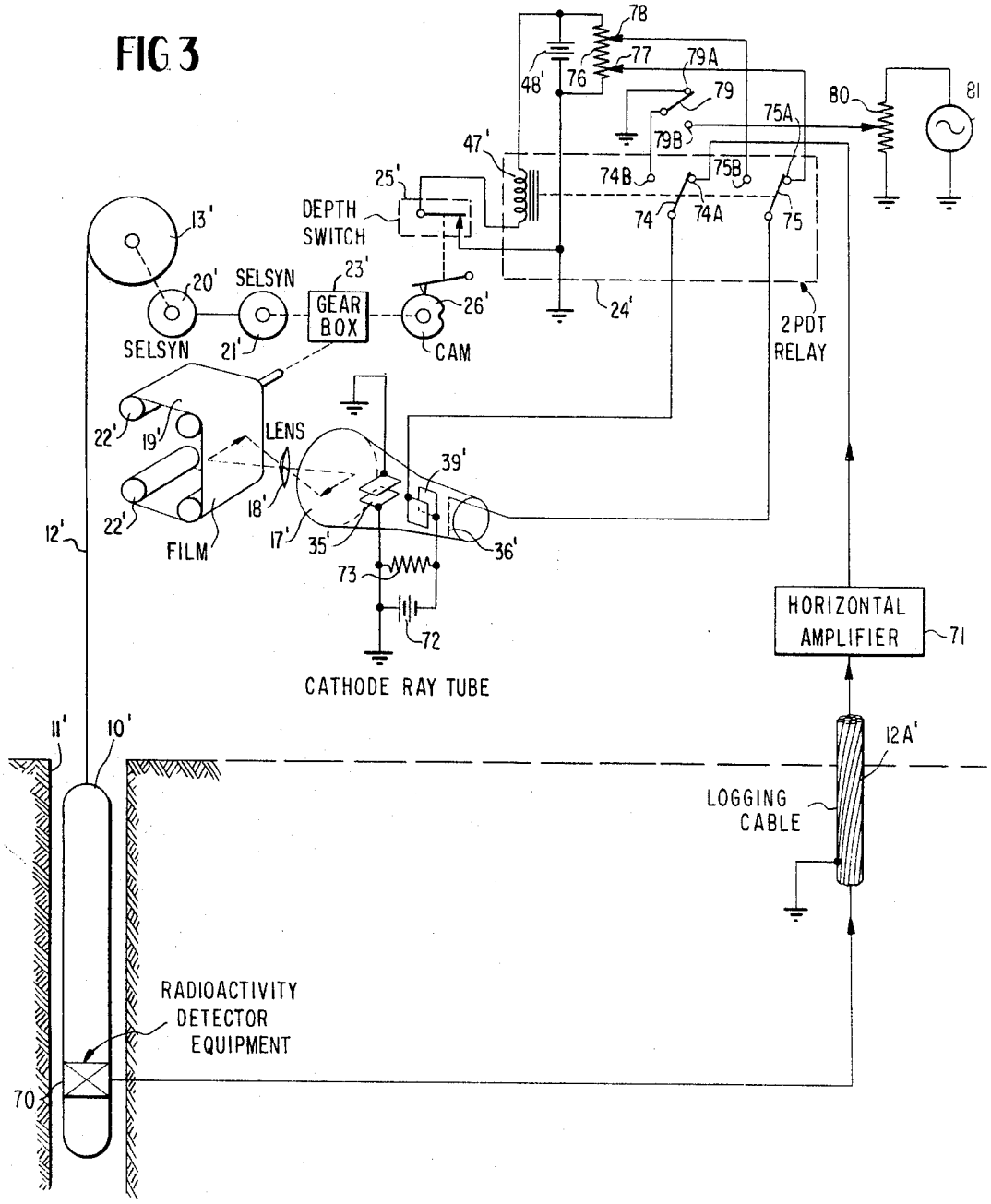

3,393,404
SYSTEM PROVIDING DEPTH MARKERS FOR BEAM DEFLECTION RECORDED WELL LOGS
Terry O. Anderson and Bruce A. Blackman, Duncan, Okla., assignors to Halliburton Company, Duncan, Okla., a corporation of Delaware
Filed Mar. 17, 1966, Ser. No. 535,212
8 Claims. (Cl. 340—18)

ABSTRACT OF THE DISCLOSURE

A strip-film cathode-ray recording well log system employs well depth markers which are applied to the log by interrupting the application of a logging signal. The logging signal may be supplied as a continuous, or regularly recurrent, series of voltages to a pair of deflection elements of the cathode-ray tube.

---

This invention relates to an improved well logging system having a cathode-ray tube presentation of the logging signals, wherein depth marker indications are automatically included in the tube presentation.

Well logging systems are employed during well drilling operations to provide a continuous record of the subsurface conditions encountered. To this end, a sensing device is incorporated in a sonde which is lowered into the borehole on a hoisting cable. Depending upon the type of well logging system employed, i.e., seismic, electric, or radioactivity logging, the sensing device measures certain conditions within the borehole which are indicative of the geological formations encountered at each depth level. With some systems it is also possible to obtain information relating to the condition of the well casing at various depths. In seismic well logging, for example, the sensing device senses seismic pulses which are reflected from the surrounding subsurface formations and which originate in a seismic transmitting device, also located in the sonde. In electric logging systems, the sensing device may comprise an electrode configuration which measures resistivity or other electrical parameters of the surrounding geological formations, while radioactivity logging systems usually employ an ionization chamber as the sensing device to detect gamma ray radiation from the surrounding formations. Regardless of the type of system employed, however, the sensing device converts the sensed information into electrical well logging signals which are usually transmitted up through the hoisting cable to a surface installation for display and/or recording.

Although several types of indicating and recording apparatus have been used at the surface installation to display and record the logging signals representing the downwell conditions, it has been found that electronic presentation means, such as cathode-ray oscilloscope, for example, are particularly satisfactory for well logging systems which utilize logging signals having a high repetition rate and short transient duration. The high repetition rate and short transient duration of seismic logging signals, for example, are not conducive to display or recordation of the signals by mechanically operated stylus devices, and the like, because of the relatively low frequency response of such devices. In a cathode-ray oscilloscope presentation, the well logging signals may be applied to the deflection means of the oscilloscope to provide a logging signal responsive beam deflection which is indicative of the downwell conditions. The resultant trace on the face of the cathode-ray tube may then be projected on a strip of photographic film for recordation. By moving the film strip at a rate proportional to the hoisting cable pay-out rate, a continuous record of the downwell conditions encountered during the drilling operation may be obtained.

For proper interpretation of the drilling record or "log," it is desirable to place a series of depth marker indications on the film strip to represent predetermined increments of cable pay-out, to thereby correlate the recorded logging signals with the precise depth at which they were obtained. In prior art system, depth marker indications are usually placed upon the log by mechanical means, such as by stylus deflection at predetermined time intervals or cable pay-out increments, or by mechanically imprinting the depth marker indications on film logs. These methods of providing depth marker indications are obviously unsuited to well logging systems employing a cathode ray tube type of signal presentation. Additionally, the known methods possess the low accuracy, high maintenance requirements and slow response time inherent in mechanical systems.

Accordingly, it is an object of this invention to provide an improved well logging system having means for automatically producing well depth marker indications in a cathode-ray oscilloscope presentation of the logging signals.

It is a further object of this invention to provide an improved well logging system having means for providing well depth marker indications in a cathode-ray oscilloscope presentation of the logging signals, wherein the depth marker means possess a high degree of accuracy and a fast response time.

It is a still further object of this invention to provide an improved well logging system having means for providing well depth marker indications in a cathode-ray oscilloscope presentation of the logging signals, wherein the depth marker means are compatible with presentation of seismic, electric, radioactivity, and other diverse types of logging signals.

Briefly, the present invention contemplates a well logging system having a cathode-ray tube presentation of the logging signals, wherein the logging signals are applied to one of the beam deflection means of the tube to provide logging signal responsive beam deflection. Cable pay-out responsive means, operative at predetermined cable pay-out increments, are provided to actuate means coupled to the cathode-ray tube beam deflection means to momentarily interrupt the logging signal responsive beam deflection at the predetermined cable pay-out increments, to thereby provide well depth marker indications in the cathode-ray tube presentation. Additional means responsive to operation of the cable pay-out means are provided to momentarily increase the intensity of the cathode-ray tube beam at the aforesaid predetermined cable pay-out increments, to thereby intensify the well depth marker indications on the tube face and the depth marker indication images produced on the film recording strip. By momentarily interrupting the logging signal responsive beam deflection at predetermined cable pay-out increments, the tube beam will be deflected by the customary biasing means to a predetermined reference point on one deflection axis of the tube, to thereby provide well depth marker indications in the form of high intensity dots. If a high intensity line form of the well depth marker indications is desired, the tube deflection means may be momentarily coupled to a source of alternating voltage at the same time that the logging signal responsive beam deflection is interrupted, to thereby cause a series of high intensity lines to appear on the face of the tube and subsequently on the film record.

In the drawings:

FIGURE 1 is a block diagram of an improved well logging system constructed in accordance with the teachings of the present invention wherein seismic logging signals are employed and the well depth marker indications take the form of high intensity dots;

FIGURE 2 is a block diagram of the system of FIGURE 1 modified to provide well depth marker indications in the form of high intensity lines; and FIGURE 3 is a block diagram of a well logging system constructed in accordance with the teachings of the present invention, wherein radioactivity logging signals are employed and the well depth marker indications may take the form of high intensity dots or high intensity lines.

Referring now to FIGURE 1 of the drawings, there is shown a well logging system which utilizes seismic pulses to obtain a log of the downwell conditions. The system illustrated in FIGURE 1 is closely related to the system disclosed in application, Ser. No. 331,598, filed Dec. 18, 1963, for "Well Logging," now Patent No. 3,302,165, to which reference may be had for further description.

The seismic logging system illustrated includes a downwell sonde 10 which is lowered into a borehole 11 by means of a hoisting cable 12 and a hoisting drum 13. A transmitting transducer 14 is provided in the sonde 10 to transmit a series of transient acoustic signals to the formations surrounding the borehole 11. A receiving transducer 15 is also located in the sonde and is spaced from transmitting transducer 14 by a sonde portion 16 which may comprise sound insulating material, so that the receiving transducer will sense the transmitted seismic pulses primarily after they have been reflected from the surrounding borehole formations. Receiving transducer 15 functions to convert the received seismic signals resulting from the pulses, which are indicative of the geological formations at a particular depth in the borehole, into electrical signals which are transmitted up cable 12 to the surface installation for presentation and recording. The hoisting cable 12, shown in enlarged section at 12A, serves the dual function of mechanically supporting the sonde 10 and of electrically transmitting the logging signals to the surface installation. In the embodiment illustrated, this cable comprises a single conductor which is insulated from an outer steel wire sheating to form a type of coaxial cable. It will be understood, however, that the cable 12 may be of the multi-conductor type, if desired.

At the surface installation, the electrical logging signals from the logging cable 12 are applied to a cathode-ray tube 17 for visual presentation in a manner which will be explained in detail hereinafter. The resulting pattern of traces appearing on the face of the cathode-ray tube 17 is projected through a lens 18 to a strip of photographic film 19 for recordation. The film strip 19 is moved adjacent the face of the cathode-ray tube along the vertical deflection axis of the tube at a rate proportional to the pay-out rate of cable 12 by means of a selsyn couple 20, 21, and a gear box 23 which mechanically interconnect the hoisting drum 13 and film drive rollers 22. By this means, as the sonde 10 is lowered into the borehole 11, the film strip 19 is continuously advanced along the vertical deflection axis of the cathode-ray tube at a rate proportional to the rate at which the sonde is lowered into the well, so that the seismic signals received at each increment of depth may be recorded on the film strip 19. Depth marker indications are presented on the face of the cathode-ray tube 17, and subsequently recorded on the film strip 19, by means of a depth marker relay 24, a depth switch 25 and a cam 26, in a manner which will be described in detail hereinafter.

In the seismic logging system illustrated in FIGURE 1 of the drawings, a trigger generator 27 is utilized to generate synchronizing pulses which actuate the transmitting transducer 14 through a delay univibrator 28 and a pulser 29. The trigger generator 27 may be located downwell in the sonde, as illustrated, or may be located at the surface installation. The synchronizing pulses from trigger generator 27 serve to trigger the delay univibrator 28 which will only emit a pulse after a predetermined time delay. Pulser 29 is energized by a high voltage supply 30 which is connected to a basic A.C. voltage supply source 31 located at the surface installation, by means of a matching filter section 32, the logging cable 12, and a filter 33. The trigger generator 27 is also energized by voltage supply source 31 through matching section 32, cable 12 and filter 33. Matching section 32 includes suitable circuitry for segregating the base power supply frequency from the synchronizing and logging information signals by means of suitable decoupling circuits for the different frequency ranges involved. The filter 33 serves to pass the basic power supply frequency, which may conveniently be 400 cycles, and to reject the synchronizing pulses and logging information signals. When the pulser 29 is actuated by an output pulse from delay univibrator 28, it energizes the transmitting transducer 14 and causes it to emit a short impulse of mechanical energy. The emitted seismic pulse from the sonde impinges upon the surrounding borehole formations and is thence transmitted to receiving transducer 15, where the received seismic signal is converted to a corresponding electrical logging signal which is amplified by a signal amplifier 34 and transmitted to the surface installation through matching section 32 and logging cable 12. In the illustrated arrangement, the electrical logging signals are applied to the vertical deflection plates 35 and the control grid 36 of the cathode-ray tube through a filter 37, an amplifier 38, and the contacts of the depth marker relay 24.

At the surface installation, the electrical logging signals are displayed as a function of time on the face of the cathode-ray tube by connecting the horizontal deflection plates 39 of the tube to a sweep generator 40 through a horizontal amplifier 41. Since initiation of operation of the sweep generator 40 must be accurately correlated with the time at which the seismic signals are received at receiving transducer 15, the synchronizing signals from trigger generator 27 are also transmitted up the logging cable 12 to the surface installation where they serve to initiate the sweep action after a suitable time delay. Furthermore, because of the tendency of the synchronizing signals to "ring out" in a prolonged transient oscillation which persists in the single transmission channel of the cable, or which results in "crosstalk" if a multi-conductor cable is employed, it is desirable to separate the logging information signals from the synchronizing pulses in the logging cable by means of a predetermined time delay. For this purpose, trigger generator 27 operates as a master timing control oscillator which recurrently generates synchronizing signals. At the surface installation and at the sonde, the synchronizing signals are responded to only after a predetermined phase delay to initiate operation of the transmitting transducer 14 and the sweep generator 40. The phase delay should be of a sufficient duration to permit the transmission transients produced by the synchronizing signals to completely subside before the logging information signals are transmitted up through the logging cable. To this end, the synchronizing signals from trigger generator 27 are passed through the filter 37 and the amplifier 38 to a pulse discriminator 42 which may conveniently take the form of a Schmitt trigger circuit. The pulse discriminator 42 is operative to supply an output voltage at a uniform level only during the persistence of an input voltage of positive polarity above a predetermined level. The operating characteristics of the pulse discriminator can be designed to supply a single pulse output having the desired leading edge phase with respect to the input signal.

Since it is possible that the pulse discriminator 42 may be inadvertently triggered by a high level logging signal received at a later time than the synchronizing pulse, the output from the pulse discriminator 42 is applied to a trigger pulse generator 43 which comprises a monostable blocking oscillator with a sufficiently long recovery time as to remain insensitive throughout the period during which the logging information signals are transmitted. The recovery time of the monostable blocking oscillator 43 should extend well beyond the period during which the logging information signals are received, but should end prior to the initiation of the next synchronizing pulse from trigger generator 27. The leading edge of the output from trigger pulse generator 43 serves to trigger an adjustable delay vibrator 44 which establishes a time delay period correlated with the delay period established by delay univibrator 28 in the sonde. The delayed output pulse from adjustable delay circuit 44 is then applied to the input of sweep generator 40 through the depth marker relay 24 and serves to initiate the sweep action of the oscilloscope 17. The sweep generator 40 is of the normally quiescent type which generates a sweep voltage of predetermined amplitude and desired duration in response to an input synchronizing signal. If no input synchronizing signal is received, sweep generator 40 serves to bias the cathode-ray tube beam to a predetermined point on one side of the tube face along the horizontal deflection axis. In practice, initiation of the sweep action is delayed until a short time prior to the arrival of the first seismic pulses at receiving transducer 15 to conserve the recording and/or indicating medium. This delay period is primarily a function of the physical distance between the transmitting transducer 14 and the receiving transducer 15.

As will be apparent from the foregoing description, the logging information signals are separated in time from the synchronizing pulses during transmission of both signals through the logging cable 12, so that prolonged or transient oscillations resulting from the synchronizing signals in the cable will not affect the quality of the logging information signals. Since the seismic logging signals are applied to the vertical deflection plates 35 of the cathode-ray tube and the sweep signal is appled to the horizontal deflection plates 39, the logging signals are plotted as a function of time on the tube face and subsequently recorded on photographic film strip 19. In practice, the seismic pulses are transmitted at a sufficiently high repetition rate so that the pattern appearing on the tube face and recorded on the film strip will usually appear as a closely spaced series of traces. It is often desirable to employ beam intensity modulation as an aid in interpreting the recorded data. For this purpose, the received logging signals may also be applied to the beam control grid 36 of the cathode-ray tube through an R-C coupling network, comprising resistor 45 and capacitor 46. By virtue of this arrangement, the logging signals will be displayed, not only by cathode-ray tube beam deflection, but also by variations in tube beam intensity.

In the logging system shown in FIGURE 1 of the drawings, the rate of movement of the film strip 19 is correlated with the rate of movement of the sonde 10 in the well so that the location of a particular trace on the film strip or "log" represents the downwell conditions existing at a particular depth in the well. The present invention contemplates the production of well depth marker indications directly in the logging signal presentation afforded by the cathode-ray tube 17. To this end, the cam 26, which is connected to the cable hoisting drum 13 through selsyn couple 20, 21, and the gear box 23, is arranged to momentarily close depth switch 25 at predetermined cable pay-out increments. Switch 25 is connected in series circuit with the operating coil 47 of depth marker relay 24 and a D.C. power supply source 48, so that closure of switch 25 serves to energize relay coil 47 and consequently actuate the relay. Depth marker relay 24 is illustrated as a three-pole, double-throw relay having a movable contact 49 connected to the input of sweep generator 40, a movable contact 50 connected to the vertical deflection plates 35 of the cathode-ray tube, and a movable contact 51 connected to the beam control grid 36 of the cathode-ray tube through the R-C coupling network 45, 46. When the depth switch 25 is not closed, the relay is not energized and movable contact 49 serves to connect the output of adjustable delay circuit 44 to the input of sweep generator 40 through a fixed contact 49A. At the same time, movable contact 50 serves to connect the vertical deflection plates 35 to the output of amplifier 38 through a fixed contact 50A, while movable contact 51 serves to connect the output from amplifier 38 to the beam control grid 36 of the cathode-ray tube through a fixed contact 51A. In this unenergized condition of the depth marker relay, the logging signals are applied to the vertical deflection plates 35 and the beam control grid 36 and the synchronizing signals are connected to the input of sweep generator 40, so that the logging signals are displayed on the face of the cathode-ray tube 17 and recorded on film strip 19. When the depth switch 25 is closed at predetermined cable pay-out increments, the relay is energized and movable contact 49 connects the input of sweep generator 40 to a "floating" contact 49B so that no sweep signal is generated and the beam is biased to the predetermined position on one side of the horizontal deflection axis. Simultaneously, movable contact 50 is shifted to a fixed contact 50B, which is grounded to thereby ground vertical deflection plates 35 and prevent vertical deflection of the cathode-ray tube beam. Movable contact 51 is shifted to a fixed contact 51B which is connected to the movable tap of a potentiometer 52. Potentiometer 52 is connected in parallel circuit with D.C. power supply source 48 so that a fixed D.C. potential is applied to a grid 36 of the cathode-ray tube. Preferably, the D.C. potential applied to the grid is of a magnitude higher than the highest instantaneous magnitude of the logging signals, so that the resultant dot which is produced by the stationary tube beam on one side of the tube face on the horizontal deflection axis is of suitably high intensity to make it readily distinguishable from the traces produced by the seismic logging signals. In this manner, each time the depth switch 25 is closed at predetermined cable pay out increments, a bright spot will appear on one side of the film strip 19 to serve as a depth marker indication. Accordingly, by counting the number of dots and, if necessary, interpolating between dots, the exact depth at which a recorded waveform was taken can be readily ascertained.

FIGURE 2 of the drawings shows a seismic well logging system substantially the same as the system of FIGURE 1 and the same reference characters have been employed to identify identical components. In the system of FIGURE 2, well depth marker indications have been provided in the form of high intensity lines which extend along the horizontal deflection axis of the cathode-ray tube and appear as horizontal lines on the film strip 19. In this embodiment of the invention, movable contact 49 of depth marker relay 24 is connected to the input of horizontal amplifier 41 rather than to the input of sweep generator 40, as in the embodiment of FIGURE 1. The input of sweep generator 40 is directly coupled to the output of adjustable delay circuit 44 and the output of the sweep generator is connected to a fixed contact 49A. Since the output of sweep generator 40 is no longer directly coupled to the input of horizontal amplifier 41, it will no longer exert a biasing action on the cathode-ray tube beam when the depth marker relay 24 is energized by actuation of depth switch 25. In this embodiment, fixed contact 49B of the relay is connected to an adjustable alternating voltage source formed by a potentiometer 60 and a fixed alternating voltage source 61, so that upon energization of the relay 24, the horizontal deflection plates 39 are connected to the alternating voltage source through horizontal amplifier 41, movable contact 49 and fixed contact 49B. The frequency of source 61 may be 60 or 400 cycles per second. Accordingly, since the cathode-ray tube beam is no longer biased to one side of the screen by the output of sweep generator 40, but is instead connected to an alternating voltage source, the beam will sweep back and forth across the face of the tube in superimposed traces along the horizontal deflection axis to produce a high intensity line which serves as a well depth marker indication.

FIGURE 3 of the drawings illustrates an improved well logging system constructed in accordance with the teachings of the present invention, wherein radioactivity logging techniques are utilized. Since many downwell formations inherently emit gamma ray radiation, it is general practice to conduct a so-called "gamma ray log" to plot the natural radiation of the borehole formation. In FIGURE 3 of the drawings, a gamma ray logging system has been illustrated. The sonde 10' in this arrangement is provided with radioactivity detector equipment 70 using an ionization chamber which converts gamma ray radiation into corresponding electrical signals. The logging signal derived from these electrical signals usually varies in value slowly with changes in depth, in proportion with local radioactivity. The logging signals are transmitted through a logging cable 12', a horizontal amplifier 71, and a well depth marker relay 24', to the horizontal deflection plates 39' of a cathode-ray tube 17'. The vertical deflection plates 35' of the cathode-ray tube are permanently grounded to prevent vertical deflection of the tube beam. By virtue of this arrangement, the tube beam is deflected by the logging signals along the horizontal deflection axis to thereby provide a continuous, wavering trace on the film strip 19'. In the same manner as the correspondingly numbered components in the systems of FIGURES 1 and 2 of the drawings, selsyn couple 20', 21', and gear box 23' link the film drive rolls 22' with the hoisting drum 13', so that the film strip 19' is moved at a rate proportional to the rate of cable pay-out. By this arrangement, the horizontal deflection of the cathode-ray tube beam at a particular point along the length of film strip 19' serves to indicate the gamma ray radiation encountered at a particular well depth. A D.C. voltage source 72 and an associated by-pass resistor 73 are connected in parallel circuit between the horizontal deflection plates 39' and ground to bias the tube beam to a predetermined position on the horizontal deflection axis of the tube.

The well depth marker relay 24' in this embodiment of the invention comprises a double-pole, double-throw relay which has an operating coil 47' energized by a D.C. voltage source 48' upon momentary closure of depth switch 25' at predetermined cable pay-out increments. A movable contact 74 of the relay is connected to the horizontal deflection plates 39' of the cathode-ray tube, while another movable contact 75 of the relay is connected directly to the beam control grid 36' of the tube. When the relay is not energized, the output of horizontal amplifier 71 is connected to the horizontal deflection plates 39' of the cathode-ray tube by means of a fixed contact 74A so that the logging signals are applied directly to the tube to cause beam deflection along the horizontal deflection axis. Also, in the unenergized condition of the relay, movable contact 75 serves to connect the cathode-ray tube grid 36' to a fixed D.C. potential connected to a fixed contact 75A. As illustrated, the D.C. potential is obtained from a first movable tap 77 of a potentiometer 76 which is connected across the fixed D.C. voltage source 48'. This arrangement provides a fixed intensity for the tube beam for displaying the electrical logging signals. When the relay 24' is energized by closure of depth switch 25' at predetermined cable pay-out increments, the movable contact 74 is shifted to a fixed contact 74B which serves to ground one of the horizontal deflection plates 39' through fixed contact 79A of a single pole, double-throw switch 79. The grounding of one of the horizontal deflection plates 39' causes the tube beam to be shifted to a predetermined point on the horizontal deflection axis of the tube because of the influence of bias supply 72 which is connected to the other horizontal deflection plate. At the same time, movable contact 75 is shifted to fixed contact 75B which is connected to a second movable tap 78 of the potentiometer 76. The movable tap 78 is set to cause a higher potential to be applied to the cathode-ray tube grid to thereby increase the beam intensity. This arrangement results in the production of a series of well depth marker indications in the form of high intensity dots located along one side of the film strip 19'. Again, by counting the dots, and, if necessary, interpolating between dots, it is possible to ascertain the gamma ray radiation at any desired depth in the well.

The system illustrated in FIGURE 3 of the drawings is also capable of producing well depth marker indications in the form of high intensity, horizontal lines. To this end, a fixed contact 79B of switch 79 is connected directly to an adjustable alternating voltage source comprising a potentiometer 80 and a fixed alternating voltage source 81. When the movable contact of the switch 79 is shifted to fixed contact 79B, the horizontal deflection plate 39' is no longer grounded when the relay is energized, but is instead connected to the alternating voltage source to provide a sweep action of the tube beam along the horizontal deflection axis. The resulting high intensity, horizontal traces on the tube face serve as well depth marker indications on the film strip 19'.

From the foregoing description, it is believed apparent that the improved well logging system of the invention provides an extremely accurate and reliable presentation of well depth marker indications in cathode-ray oscilloscope presentations of the logging signals. The well depth marker indications are automatically included in the cathode-ray tube presentation of the logging signals and are transferred directly to the film recording strip, thereby eliminating the need for cumbersome and often unreliable mechanical depth marking devices. The equipment utilized for production of the well depth marker indications in the disclosed systems can be packaged to be of extremely small size and weight and may be easily included in the surface installation.

It is believed apparent that many changes could be made in the above construction and many apparently widely different embodiments of the invention could be made without departing from the scope thereof. For example, the teachings of the invention are clearly applicable to logging systems of any type which utilizes a cathode-ray oscilloscope form of logging signal presentation. Similarly, it will be understood that the means for momentarily increasing the cathode ray tube beam intensity at predetermined cable pay-out increments may be dispensed with, if desired. Accordingly, it is intended that all matter contained in the above description, or shown in the accompanying drawings, shall be interpreted as illustrative and not in a limiting sense.

What is claimed is:
1. A well logging system comprising:
 a cable;
 a sonde carried by said cable;
 cable pay-out responsive means operative at predetermined cable pay-out increments;
 logging means in said sonde responsive to downwell conditions to feed electrical logging signals up said cable;
 a surface recorder receiving the logging signals from said cable, said recorder comprising
 a cathode-ray tube having first beam deflection means and a beam control grid, said beam deflection means being responsive to said logging signals to provide logging signal responsive beam deflection; and
 means coupled to said first beam deflection means and responsive to operation of said cable pay-out means during the presence of electric logging signals from said cable to momentarily interrupt logging signal responsive beam deflection at said predetermined cable pay-out increments, to thereby provide well depth marker indications in the cathode-ray tube presentation.

2. A well logging system as claimed in claim 1, further comprising second means coupled to said beam control grid and responsive simultaneously with said first means to operation of said cable pay-out means to momentarily increase the cathode-ray tube beam intensity at said predetermined cable pay-out increments.

3. A well logging system as claimed in claim 1, further comprising
a source of alternating voltage; and
second means coupled to said source and responsive simultaneously with said first means to operation of said cable pay-out means to momentarily couple said alternating voltage source to said beam deflection means at said predetermined cable pay-out increments.

4. A well logging system as claimed in claim 1, further comprising
a source of alternating voltage;
second means coupled to said source and responsive simultaneously with said first means to operation of said cable pay-out means to momentarily couple said alternating voltage source to said beam deflection means at said predetermined cable pay-out increments; and
third means coupled to said beam control grid and responsive simultaneously with said first means and said second means to operation of said cable pay-out means to momentarily increase the cathode-ray tube beam intensity at said predetermined cable pay-out increments.

5. A well logging system comprising:
a cable;
a sonde carried by said cable;
cable pay-out responsive means operative at predetermined cable pay-out increments;
logging means in said sonde responsive to downwell conditions to feed a recurrent series of electrical logging signals up said cable;
a surface recorder receiving the logging signals from said cable, said recorder comprising
a cathode-ray tube having first beam deflection means operative to deflect the tube beam along a first axis, second beam deflection means operative to deflect the tube beam along a second time locus axis perpendicular to said first axis and a beam control grid operative to control the intensity of the tube beam, the first beam deflection means being responsive to said logging signals to provide logging signal responsive beam deflection along the first axis;
a film strip;
means for moving said film strip adjacent the face of said tube along said first axis at a rate proportional to the pay-out rate of said cable so that said film strip is adapted to continuously record the logging signals produced at the different well depths in aligned transverse traces; and means coupled to said second beam deflection means for biasing the tube beam to a predetermined reference point lying on said second time locus axis; and
first means coupled to the first beam deflection means and responsive to operation of said cable pay-out means to momentarily interrupt logging signal responsive beam deflection at said predetermined cable pay-out increments throughout persistence of a recurrent signal of said sequence to thereby provide well depth marker indications on said film at predetermined increments of film travel.

6. A well logging system as claimed in claim 5, further comprising
second means coupled to said beam control grid and responsive simultaneously with said first means to operation of said cable pay-out means to momentarily stabilize beam deflection along said second axis and increase the cathode-ray tube beam intensity at said predetermined cable pay-out increments, to thereby provide intensified well depth marker indications on said film.

7. A well logging system as claimed in claim 6 wherein said biasing means comprises a sweep generator of the normally quiescent type which is operative to produce a sweep voltage in response to a signal applied to its input, and said first means is operative to open circuit the input to said sweep generator, to thereby provide well depth marker indications in the form of high intensity dots located at said predetermined reference point on said second tube axis.

8. A well logging system as claimed in claim 6, wherein said biasing means comprises a sweep generator of the normally quiescent type which is operative to produce a sweep voltage in response to a signal applied to its input, and said first means is operative to decouple the output of the sweep generator from said second beam deflection means and to apply an alternating voltage thereto, to thereby provide well depth marker indications in the form of high intensity lines located on said second tube axis.

References Cited

UNITED STATES PATENTS

| Re. 25,928 | 12/1965 | Geyer et al. | 340—18 |
| 3,170,136 | 2/1965 | Howes | 340—18 |
| 3,302,165 | 1/1967 | Anderson et al. | 340—18 |
| 3,333,237 | 7/1967 | Chapman | 340—18 X |

FOREIGN PATENTS

| 726,305 | 1/1966 | Canada. |

RODNEY D. BENNETT, *Primary Examiner.*

BENJAMIN A. BORCHELT, *Examiner.*

R. M. SKOLNIK, C. E. WANDS, *Assistant Examiners.*